(12) United States Patent
Deshpande et al.

(10) Patent No.: US 10,089,407 B2
(45) Date of Patent: Oct. 2, 2018

(54) SYSTEMS, METHODS, AND APPARATUSES FOR IMPLEMENTING ANALYTICS ON DEMAND FUNCTIONALITY

(71) Applicant: salesforce.com, inc., San Francisco, CA (US)

(72) Inventors: Suyog Anil Deshpande, Foster City, CA (US); Keith D. Bigelow, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 735 days.

(21) Appl. No.: 14/491,984

(22) Filed: Sep. 20, 2014

(65) Prior Publication Data
US 2015/0088851 A1   Mar. 26, 2015

Related U.S. Application Data

(60) Provisional application No. 61/880,542, filed on Sep. 20, 2013.

(51) Int. Cl.
*G06F 17/30* (2006.01)

(52) U.S. Cl.
CPC .. *G06F 17/30905* (2013.01); *G06F 17/30867* (2013.01)

(58) Field of Classification Search
CPC .................... G06F 17/30905; G06F 17/30867
See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |

(Continued)

*Primary Examiner* — Loc Tran
(74) *Attorney, Agent, or Firm* — Elliott Ostrander & Preston, P.C.

(57) ABSTRACT

In accordance with disclosed embodiments, there are provided systems, methods, and apparatuses for implementing analytics on-demand functionality. An exemplary system may include, for example: means for storing a plurality of objects within a database of the system, each object having a database table embodied therein; maintaining a data repository of custom report types, each custom report type defining a mapping between two or more of the database tables; means for receiving a request from a user client device communicably interfaced to the system, in which the request is for analytics data responsive to a user initiated event originating at the user client device; means for introspecting the data repository of custom report types and identifying one or more visualizations to be returned to the user client device for display; means for restricting the identified one or more visualizations by context of the user client device passed with the request from the user client device; and means for returning the one or more visualizations identified to the user client device. Other related embodiments are disclosed.

24 Claims, 11 Drawing Sheets

(56) References Cited

U.S. PATENT DOCUMENTS

| | | |
|---|---|---|
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 8,244,714 B1 * | 8/2012 | Collins ............ G06F 17/30554 707/714 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260608 A1 * | 12/2004 | Lewis ................ G06Q 20/20 705/14.35 |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0234753 A1 * | 10/2005 | Pinto .................... G06Q 10/04 700/44 |
| 2009/0138427 A1 * | 5/2009 | Kalavade .......... G06Q 10/0637 |
| 2011/0119725 A1 * | 5/2011 | Roberts .............. H04N 7/17318 725/114 |
| 2014/0278623 A1 * | 9/2014 | Martinez .................... G06F 8/36 705/7.12 |
| 2015/0082219 A1 * | 3/2015 | Beck ...................... G06Q 10/06 715/771 |

* cited by examiner

SYSTEMS, METHODS, AND APPARATUSES FOR IMPLEMENTING ANALYTICS ON DEMAND FUNCTIONALITY

CLAIM OF PRIORITY

This application is related to, and claims priority to, the provisional utility application entitled "ANALYTICS ON DEMAND," filed on Sep. 20, 2013, having an application Ser. No. 61/880,542, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention relate generally to the field of computing, and more particularly, to systems, methods, and apparatuses for implementing analytics on demand functionality. Such means may be implemented within the computing architecture of a hosted computing environment, such as an on-demand or cloud computing environment which utilizes multi-tenant database technologies, client-server technologies, traditional database technologies, or other computing architecture in support of the hosted computing environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

As mobile technologies and cloud computing technologies continue to advance there are many benefits for end users including ready access to data in a seamless manner from nearly anywhere a capable device is connected to the Internet. The ability to access such information from anywhere at anytime is especially helpful to businesses which are able to provide centrally accessible data, analytics, status, business reports, metrics, and other relevant information to their employees.

Despite the availability of such data from nearly anywhere and at nearly any time, there remains the problem with accessing not just the right information, but being able to access the right information in the right way and having such data provided through an appropriate visualization for the task at hand.

One significant drawback of prior analytics solutions is that any kind of visualization, dashboard, or other graphical interface and presentation of available data needs to be known and pre-arranged in advance, such that it can be enabled and rendered through the appropriate systems and onto Graphical User Interfaces (GUIs) of appropriate devices.

However, there are situations where a consumer of such data, such as a company employee, salesperson, etc., may simply not know in advance what question is to be asked or how the data should be visualized. Rather, it may be that they do not know what question to ask or what visualization is most appropriate until the time at which the data visualizations are required, at which time it is far too late to gain access to such visualizations using conventionally available analytics solutions. Another potential issue is that the employees or end-users may never know what questions to ask, and thus, would benefit from being shown examples or a variety of visualizations from which to choose.

One problem therefore is not knowing what questions are to be asked, and thus, what reports are to be created, until it is too late.

Another problem with current analytics solutions is that while data can be rendered and displayed to mobile devices, such devices require excessive context switching between screens, applications, and interfaces to accomplish even the most simplistic of tasks, all of which complicates applications and frustrates users.

Still a further problem with current analytics solutions is that data is not provided through a single repository or view, but rather, users must navigate amongst a variety of sources and data repositories to view all the pertinent data for any given class of information, such as a particular account.

Unfortunately, it is excessively costly and time consuming to pre-create every possible data visualization and every possible permutation of report or data mix that could be conceived of, and thus, it is simply is not a feasible solution to pre-create and store such reports.

The present state of the art may therefore benefit from the systems, methods, and apparatuses for implementing analytics on demand functionality as is described herein.

BRIEF DESCRIPTION OF THE DRAWINGS

Embodiments are illustrated by way of example, and not by way of limitation, and will be more fully understood with reference to the following detailed description when considered in connection with the figures in which.

DETAILED DESCRIPTION

Figure 1:
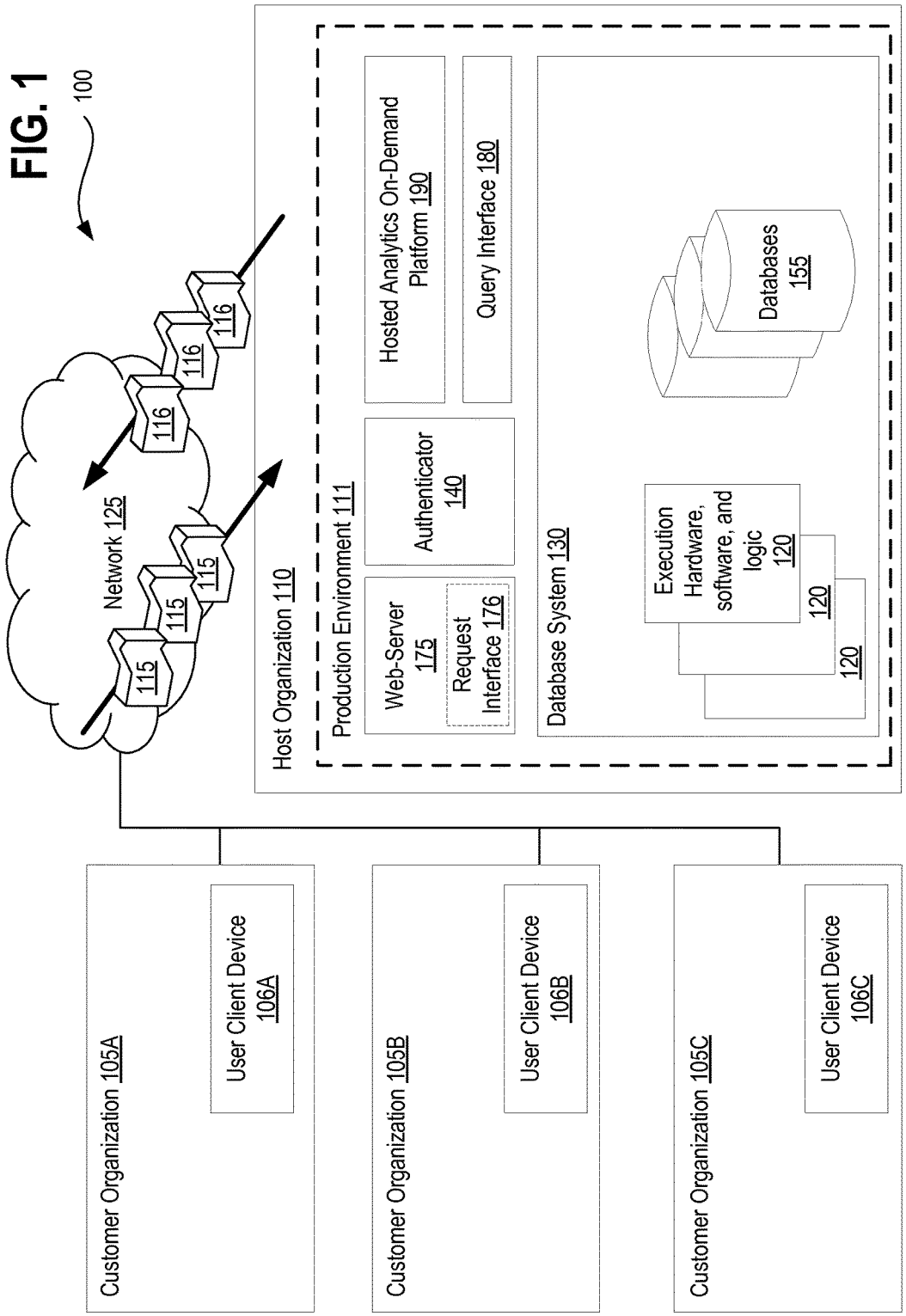
FIG. 1 depicts an exemplary architecture in accordance with described embodiments.

Described herein are systems, methods, and apparatuses for implementing analytics on demand functionality. An exemplary system may include, for example: means for storing a plurality of objects within a database of the system, each object having a database table embodied therein; maintaining a data repository of custom report types, each custom report type defining a mapping between two or more of the database tables; means for receiving a request from a user client device communicably interfaced to the system, in which the request is for analytics data responsive to a user initiated event originating at the user client device; means for introspecting the data repository of custom report types and identifying one or more visualizations to be returned to the user client device for display; means for restricting the identified one or more visualizations by context of the user client device passed with the request from the user client device; and means for returning the one or more visualizations identified to the user client device.

For instance, at a user interface of a user client device an end user may display a page having all the data associated with a particular database table, such as an account type table for the fictitious company "ACME." At the top of that page there may be a button or other graphical component which enables the end-user to, on-demand and without having pre-arranged ahead of time, call for insights into the displayed data and show visualizations corresponding to the on-demand analytics provided. For instance, clicking or pressing a "show insights" button initiates a call to show insights and triggers an analytics engine or a hosted analytics on-demand platform such that when the user clicks the button at the user device (e.g., such as a smart phone, tablet, PC, etc.), the analytics reports and graphs, charts, or other visualizations are retrieved for display at the user device based on what reports, charts, graphs, and visualizations are relevant to the account being viewed at the user device. For instance, where an account type database table is being viewed, it may be that reports that are relevant to account ACME are pulled in along with relevant data, records, tables, reports, relevant visualizations, and anything else determined to correlate with ACME as the table being viewed. On the fly, the on-demand analytics engine analyzes the data retrieved and presents multiple views through which the end-user is able to visualize the data.

At the user device and within the graphical user interface displayed to the user the is able click a "show insights" button or any other appropriate graphical trigger which in turn causes a series of visualizations to be retrieved based on the user's context, specifically, the user's identity as well as what the user is viewing, such as the ACME account data. Upon clicking the show insights button, the ACME account is, for example, depicted within a pie chart and highlighted or called out, which is possible to do based on the contextual knowledge of which account (e.g., ACME) the user was viewing at the time that the request for show insights or the on-demand analytics was triggered.

In one embodiment several visualizations are returned to the user device and each are capable of display to a graphical user interface and the user may scroll or swipe through them within a graphical carrousel mechanism which permits multiple visualizations to be present despite not all of them fitting within the page display space at once. Scrolling or swiping through the multiple returned visualizations permits the user to quickly view and then select the one most desirable or appropriate, or select one for further study and then drill down into further detail or child data of the parent object by clicking or double clicking or hovering, etc., as is common with such gesture and touch based graphical interfaces. For example, where multiple visualizations are returned, it may be that one is a present data and status of accounts, one may be a historical view of accounts or account performance, one may be a forecasting visualization related to the selected account, or any number of other available business metrics, views, charts, graphs, or visualizations.

Currently available analytics engines permit the curating of information and to place such information into pre-created and purposefully provided visualizations within, for example, a dashboard, etc. Unfortunately, such a process requires the engagement of the IT or development group which can be time consuming for end-users which must make the request, describe the request, and then wait for it to be fulfilled. With the show insights capabilities to provide analytics on-demand a user may view parent objects, child objects, related objects, view the textual data associated with such objects, be they contacts, accounts, sales opportunities, etc., and then with the press of a button, retrieve visualizations on-demand, from which a most appropriate visualization may be selected. It is possible that the user requesting the on-demand visualizations doesn't yet know themselves what visualization, chart, or graph would be best to fit the data provided, yet may "know it when they see it," and derive important insights from the data which may be difficult to ascertain from simply viewing raw data.

For example, an on-demand analytics engine may operate by viewing what information, linkages, associations, mappings, etc., already exist between the various data sources within the system, including data that directly links, indirectly points, or merely describes such associations (e.g., such as metadata) such that the analytics engine may return with a full gallery of charts, graphs, and visualizations that depict relevant information for any given data object or database table.

Thus, rather than an end user having to know in advance what to ask the system, the same end-user can instead ask the system, "show me what there is to be known." The underlying visualizations are tied to reports that a user, customer organization, or developer wrote at some time to present and depict data, and the analytics engine is enabled to explore those linkages which tie objects together and then dynamically render a carrousel of visualizations, charts, and graphs with relevant information based (or restricted or limited or filtered as it were) on what the user is viewing at the user client device as that moment in time. The information is then returned to the end user device for viewing via a graphical interface (e.g., within a carrousel or other appropriate mechanism) such that the user can flip, scroll, slide, or swipe through and identify the pertinent visualizations or the most appropriate visualizations.

Take for example a repository having a total of 20 custom report templates (CRTs) thus making a theoretical possible 20 different visualizations feasible for rendering to a user client device. Each of the 20 different visualizations may, for example, receive at the analytics engine as an incoming parameter, the object or database table (e.g., ACME account table) as its filtering or restriction criteria and then the reports, charts, graphs, and visualizations would be manipulated using that input parameter to pull the appropriate source data and where appropriate, select, highlight, or emphasize the contextually relevant input, such as the ACME account within a larger aggregation of data given that the ACME account was the parameter passed as the input. Thus, the analytics engine utilizes a repository of already existing custom report templates, but filters and configures them as appropriate. If a sub-set of those 20 total visualizations where wholly unrelated to the ACME account as the incoming object, then they could be restricted out so as not to pollute the returned results with irrelevant visualizations which are unlikely to be helpful or of interest to the end user. Use of unified and standardized metadata within the system further drives functionality as the custom report types may be treated as building blocks to render the visualizations, charts, and graphs, without having to custom develop each one for any given object, user, or customer organization. Stated differently, the custom report types are reusable for many different objects, users, and customer organizations as there is a significant overlap in the type and class of data structures consumed by the various custom report types, despite there obviously being differences in the underlying data represented by such visualizations. For instance, it may be the case that the required set of metadata is identical for each one of a subset of the 20 available reports, and thus, each may be generated from the same underlying dataset, regardless of the resulting visualization of that data. Similarly, different customer organizations may have the same parameter set or restrictions and utilize the same data structures and metadata and thus be able to utilize the same CRTs, notwithstanding having presumably different underlying data.

For instance, where filtering or restricting according to an account type object for ACME, the analytics engine will require that ACME be a member of any set where the visualization is to be presented to the user, else it will be deemed irrelevant and simply ruled out.

For many end-users, it will be beneficial to view data in the aggregate, and thus, through the show insights capability at the end user's device which leverages the hosted on-demand analytics platform, the end user may ask: "What should I know before I walk in and engage with this sales opportunity." A salesperson would benefit from knowing the salient details before entering such a meeting, and thus, the visualizations presented may be a carrousel of open cases, forecasted revenue, commissions, profits, current, past, or requested terms, etc., so as to best enable that salesperson to have an effective sales pitch and a more favorable sales opportunity. As before, the visualizations returned will be based on the context of the end-user at the end user device as the analytics engine will consider both the user's identity and also the context for data presently being viewed by that particular user when the on-demand analytics are requested.

Certain embodiments operate within a hosted computing environment, also referred to as a provider of on-demand services, on-demand database services, cloud computing services, or simply a host organization that provides services to subscribing customer organizations. Such host organizations utilize various technologies to service many different tenants (e.g., customer organizations and their users) simultaneously. Such technologies may include, for example, client-server implementations, computing grids, computing pods or pools of work machines, traditional databases, single tenancy database systems and/or multi-tenant database systems. A multi-tenant database system in particular operates to store data on behalf of a multitude of subscribers, each being a "tenant" of the database system, hence the term multi-tenant database system. Many subscribers (e.g., users or tenants) utilize the computing technologies of the host organization to access analytics, charts, views, reports, and other such data which is stored within the servers, systems, databases, and multi-tenant database system of the host organization. For instance, a sales team may utilize sales data stored within such a system or customers may generally submit data to be stored within the system and execute search queries against such a system, in which case the system returns search results.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1 depicts an exemplary architecture 100 in accordance with described embodiments. In one embodiment, a production environment 111 is communicably interfaced with a plurality of user client devices 106A-C (e.g., such as mobile devices, smart phones, tablets, PCs, etc.) through host organization 110. In one embodiment, a database system 130 includes databases 155, for example, to store object data, tables, datasets, and underlying database records with user data on behalf of customer organizations 105A-C (e.g., users of such a database system 130 or tenants of a multi-tenant database type database system or the affiliated users of such a database system). In alternative embodiments, a client-server computing architecture may be utilized in place of the database system 130 or alternatively, a computing grid, or a pool of work servers, or some combination of hosted computing architectures may be utilized to carry out the computational workload and processing demanded of the host organization 110.

The database system 130 depicted in the embodiment shown includes a plurality of underlying hardware, software, and logic elements 120 that implement database functionality and a code execution environment within the host organization 110. In accordance with one embodiment, database system 130 further implements databases 155 to service database queries and other data interactions with the databases 155. The hardware, software, and logic elements 120 of the database system 130 are separate and distinct from a plurality of customer organizations (105A, 105B, and 105C) which utilize the services provided by the host organization 110 by communicably interfacing to the host organization 110 via network 125. In such a way, host organization 110 may implement on-demand services, on-demand database services or cloud computing services to subscribing customer organizations 105A-C.

Host organization 110 receives input and other requests 115 from a plurality of customer organizations 105A-C via network 125 (such as a public Internet). For example, incoming search queries, database queries, API requests, interactions with displayed graphical user interfaces and displays at the user client devices 106A-C, or other inputs may be received from the customer organizations 105A-C to be processed against the database system 130, or such queries may be constructed from the inputs and other requests 115 for execution against the databases 155 or the query interface 180, pursuant to which results 116 are then returned to an originator or requestor, such as a user of one of a user client device 106A-C at a customer organization 105A-C.

The host organization 110 provides support for a hosted analytics on-demand platform 190 in accordance with a particular embodiment which enables the selection and rendering of a variety of data visualizations, reports, and report aggregations on-demand, triggered by an end-user, without having to request modification to an analytics GUI or platform itself. For instance, with past solutions, it was necessary for such a user to identify which report was to be provided as a visualization to a GUI interface, submit a formal request to an Information Technology (IT) Support group, development group, or other such support personnel having access and capability to modify the GUI, and then once such changes were instituted within the analytics platform, then and only then could the end-user access the visualization. However, with the hosted analytics on-demand platform 190 such end-users are enabled to readily access desired visualizations on-demand, through a GUI interface, without having to know in advance what reports, visualizations, or data aggregations are desired, without having to know in advance what context, data object, or account would be referenced to create the visualization, and without having to navigate the conventional support infrastructure described above in order to have the desired changes made available within the end-users GUI.

In one embodiment, each customer organization 105A-C is an entity selected from the group consisting of: a separate and distinct remote organization, an organizational group within the host organization 110, a business partner of the host organization 110, or a customer organization 105A-C that subscribes to cloud computing services provided by the host organization 110.

In one embodiment, requests 115 are received at, or submitted to, a web-server 175 within host organization 110. Host organization 110 may receive a variety of requests for processing by the host organization 110 and its database system 130. Incoming requests 115 received at web-server 175 may specify which services from the host organization 110 are to be provided, such as query requests, search request, status requests, database transactions, graphical user interface requests and interactions, processing requests to retrieve, update, or store data on behalf of one of the customer organizations 105A-C, code execution requests, and so forth. Web-server 175 may be responsible for receiving requests 115 from various customer organizations 105A-C via network 125 on behalf of the query interface 180 and for providing a web-based interface or other graphical displays to an end-user user client device 106A-C or machine originating such data requests 115.

Host organization 110 may implement a request interface 176 via web-server 175 or as a stand-alone interface to receive requests packets or other requests 115 from the user client devices 106A-C. Request interface 176 further supports the return of response packets or other replies and responses 116 in an outgoing direction from host organization 110 to the user client devices 106A-C.

The host organization 110 additionally provides a query interface 180 capable of receiving and executing requested queries against the databases and storage components of the database system 130 so as to return a result set, response, or other requested data in furtherance of the methodologies described. Query interface 180 additionally provides functionality to pass queries from web-server 175 into the database system 130 for execution against the databases 155 for processing search queries, or into the other available data stores of the host organization's production environment 111. In one embodiment, the query interface 180 implements an Application Programming Interface (API) through which queries may be executed against the databases 155 or the other data stores.

Authenticator 140 operates on behalf of the host organization to verify, authenticate, and otherwise credential users attempting to gain access to the host organization.

Figure 2:
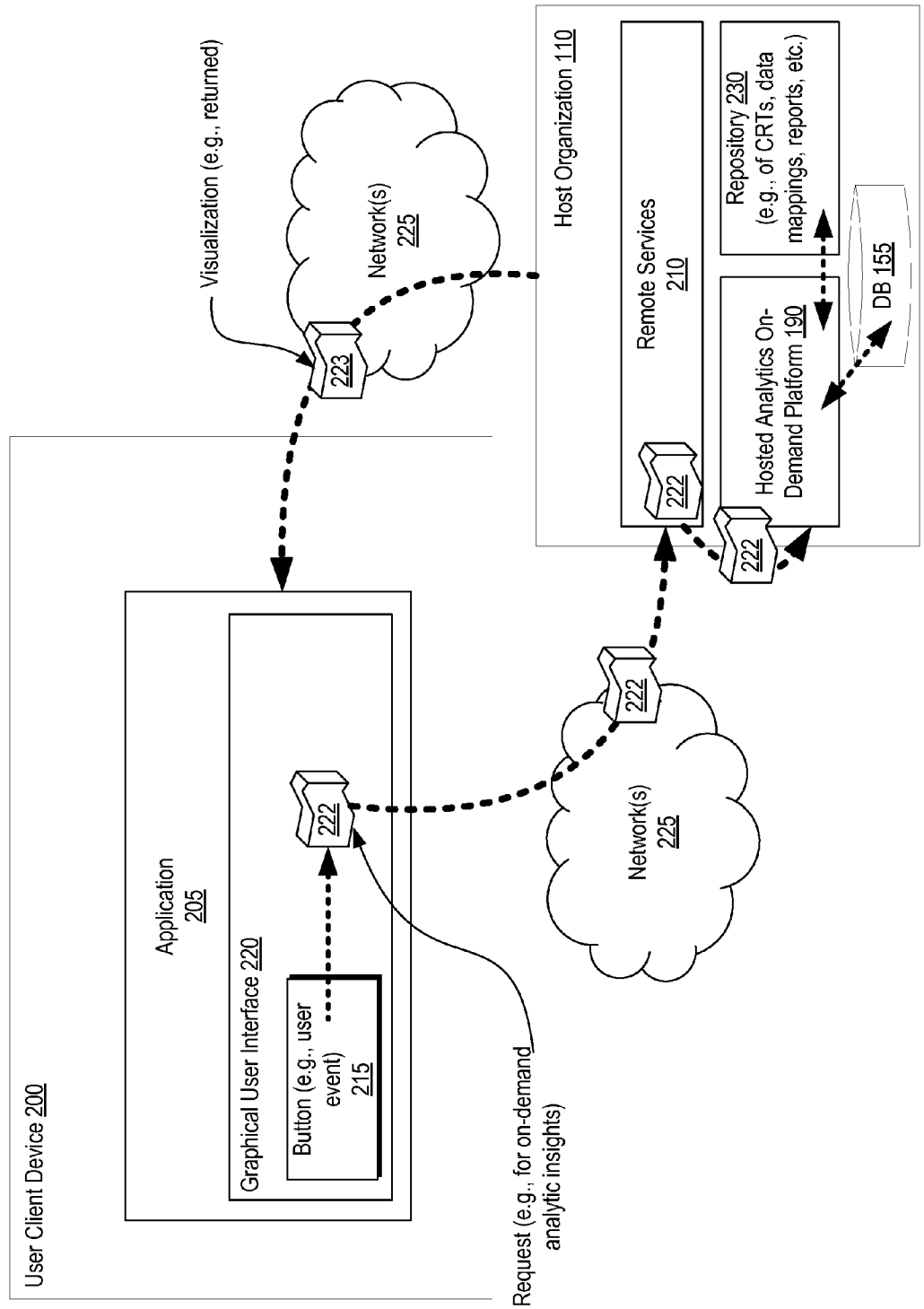
FIG. 2 depicts a user client device in additional detail.

FIG. 2 depicts a user client device 200 (e.g., refer to user client devices 106A-C from FIG. 1) in additional detail. The host organization 110 is also shown here as implementing the hosted analytics on-demand platform 190.

Customers expect ready access to data, however, prior analytics solutions are only capable of providing data, reports, and visualizations in accordance with what questions have been asked, answered, and configured into an analytics tool and corresponding GUI 220. While it would be theoretically possible to pre-create every possible variant of data amalgamation, report, and visualization, it simply is not feasible to do so owing to the computational burdens and storage costs as well as the fact that such processing would require an inordinate amount of time, and thus, potentially result in the same problem. That is to say, even if a system did attempt to pre-create all such variations, it may not be able to finish the required processing to render the requested visualization at a GUI by the time that such a visualization is requested by an end-user. Notwithstanding the need for better access to such data on the fly, prior analytics solutions lack functionality to dynamically create relevant and new contexts for end-user consumption.

Depicted within the user client device 200 is application 205 provided at such a device which is capable of accessing cloud based services provided by the host organization 110 via remote services 210, and more particularly, the application includes a Graphical User Interface 220 having thereupon a button 215, such as a user event trigger, etc., which is capable of initiating, triggering, instantiating, or otherwise causing a request 222 for on-demand analytic insights to be transmitted from the application 205 at the user client device 200, through networks 225 (e.g., through the cloud, such as over the Internet, VPN (e.g., virtual private network), or other relevant network, etc.), and to the host organization 110 where the request 222 is then received and processed by the remote services 210, and more specifically, handled by the hosted analytics on-demand platform 190 of the host organization 110.

According to the described embodiments, information passed along with the request 222 for on-demand analytic insights from the hosted analytics on-demand platform 190 includes at least context information for the requestor, such as a UserID associated with the end-user of user client device 200, an Organizational Identifier (e.g., OrgID) associated with the user client device 200, as well as relevant information for what objects, tables, data structures, or other information is presently being accessed by user client device 200. For example, if the user were viewing information about account "ACME," then context information passed with the request 222 may include an identifier for the relevant table or object being viewed as well as information describing the user and/or affiliated customer organization or OrgID.

At the host organization 110, the hosted analytics on-demand platform 190 responsible for processing the incoming request 222 analyzes the context associated with such a request 222 and then proceeds to access the relevant object, table, or database records from the database 155 based on the request and provided context, but additionally references a stored repository 230 of available Custom Report Types (CRT) which provides a data mapping between two or more tables, objects, or data sources such that the multiple sources may be aggregated via a database join and then depicted via an appropriate visualization 223 which is returned by the host organization 110 to the application 205 for display to the graphical user interface 220.

In certain embodiments, a user may be reviewing a particular data object, database table, or record set (e.g., such as a list of sales opportunities, a list of accounts, a list of patients, a list of contacts, an order list, etc.) from within the application 205 and when the request 222 for on-demand analytic insights is triggered by the user via button 215 and transmitted to the host organization then the hosted analytics on-demand platform 190 will interpret the incoming request based on the context of the information presently being viewed at the graphical user interface 220 by the user. For example, if the user is a medical doctor viewing a list of patients, then context information passed with the request may include the doctor's user identity, the customer organization with whom the doctor is affiliated (e.g., such as a hospital or doctor's office, etc.), and an object identifier or table identifier for the information presently being viewed by the doctor, which in this particular example would be a reference to the patient list being viewed. This contextual information is then utilized to filter the repository 230 of available customizable report types, data mappings, and reports for those that are relevant to the information being viewed. Continuing with the doctor example, the repository 230 of available customizable report types, data mappings, and reports may be filtered to reports and visualizations that describe medications taken by any particular patent on the patient list, other retrievable medical data for such patients, aggregated insurance classifications for the list of patients, business metrics for the patients, scheduling information for the patients, and so forth. Such information would most likely be retrieved from other data objects distinct from the patient list being viewed by the doctor at the user client device, however, the repository 230 of available customizable report types, data mappings, and reports provides the appropriate data mapping and the visualization of the data mapping.

The preceding example is meant to be merely illustrative as such objects, data objects, data records, and the data mappings are custom created by the user or customer organization and as such, the variety of such data objects and relevant mappings between them is limitless. For instance, within the remote services 210 provided by the host organization 110 customers may create a CRT that defines a desired relationship/mapping between the two objects that is of interest to users of, for example, a hospital management system. Using provided templates such users may create a report, chart, or other visualization that references the provided templates and then provides pointers to, for example, a patient's data object and a patient's medications data object, such that the visualization 223 returned to the user can display to the graphical user interface a visualization of the doctor's patients and their medications.

Importantly, it is not necessary for the user to pre-arrange for this visualization to be provided via the application 205 or the graphical user interface 220. Rather, by clicking on the button 215 to request 222 the on-demand analytic insights, the user is provided with a selection of available analytics that are contextually relevant to that particular user and to the context of data or information presently being viewed. In such a way, it is not necessary for the user to know in advance what visualization should be provided at the GUI as it is selectable at run-time by the user.

Figure 3A:
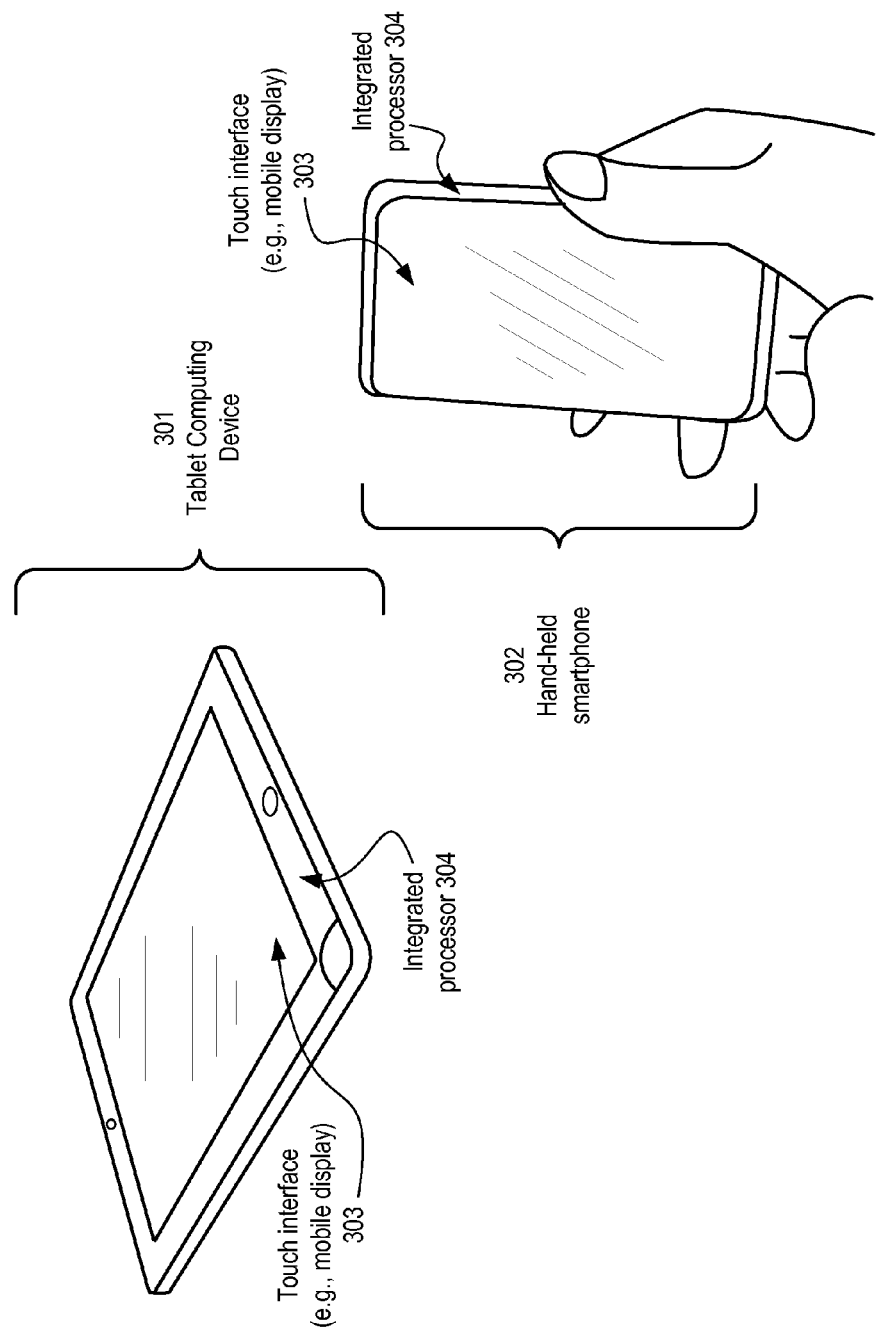
FIG. 3A depicts a tablet computing device and a hand-held smartphone each having a circuitry integrated therein as described in accordance with the embodiments.

FIG. 3A depicts a tablet computing device 301 and a hand-held smartphone 302 each having a circuitry integrated therein as described in accordance with the embodiments. As depicted, each of the tablet computing device 301 and the hand-held smartphone 302 include a touch interface 303 (e.g., a touchscreen or touch sensitive display) and an integrated processor 304 in accordance with disclosed embodiments.

For example, in one embodiment, a system embodies a tablet computing device 301 or a hand-held smartphone 302, in which a display unit of the system includes a touchscreen interface 303 for the tablet or the smartphone and further in which memory and an integrated circuit operating as an integrated processor are incorporated into the tablet or smartphone, in which the integrated processor implements one or more of the embodiments described herein. In one embodiment, the integrated circuit described above or the depicted integrated processor of the tablet or smartphone is an integrated silicon processor functioning as a central processing unit (CPU) and/or a Graphics Processing Unit (GPU) for a tablet computing device or a smartphone.

Figure 3B:
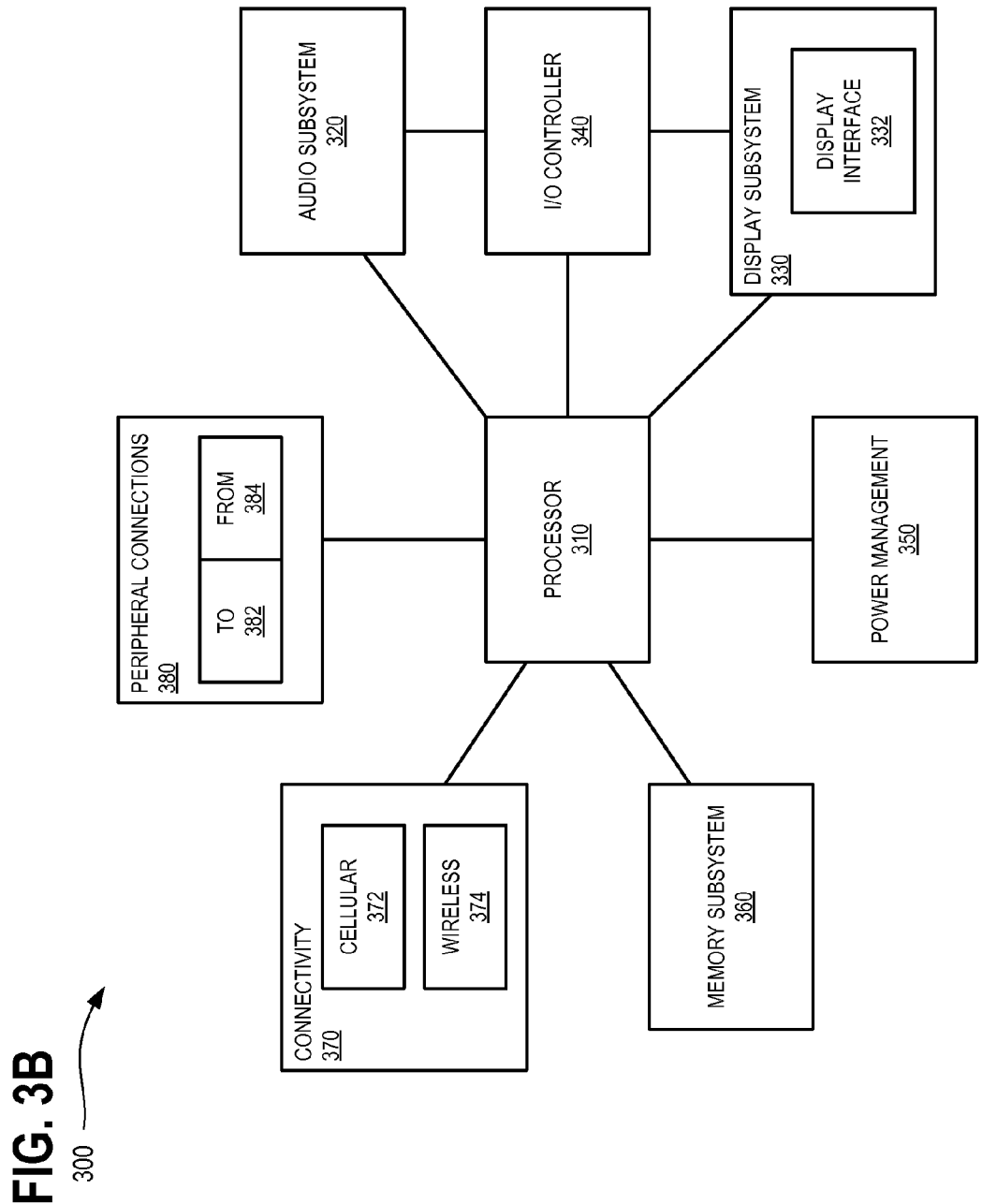
FIG. 3B is a block diagram of an embodiment of tablet computing device, a smart phone, or other mobile device in which touchscreen interface connectors are used.

FIG. 3B is a block diagram 300 of an embodiment of tablet computing device, a smart phone, or other mobile device in which touchscreen interface connectors are used. Processor 310 performs the primary processing operations. Audio subsystem 320 represents hardware (e.g., audio hardware and audio circuits) and software (e.g., drivers, codecs) components associated with providing audio functions to the computing device. In one embodiment, a user interacts with the tablet computing device or smart phone by providing audio commands that are received and processed by processor 310.

Display subsystem 330 represents hardware (e.g., display devices) and software (e.g., drivers) components that provide a visual and/or tactile display for a user to interact with the tablet computing device or smart phone. Display subsystem 330 includes display interface 332, which includes the particular screen or hardware device used to provide a display to a user. In one embodiment, display subsystem 330 includes a touchscreen device that provides both output and input to a user.

I/O controller 340 represents hardware devices and software components related to interaction with a user. I/O controller 340 can operate to manage hardware that is part of audio subsystem 320 and/or display subsystem 330. Additionally, I/O controller 340 illustrates a connection point for additional devices that connect to the tablet computing device or smart phone through which a user might interact. In one embodiment, I/O controller 340 manages devices such as accelerometers, cameras, light sensors or other environmental sensors, or other hardware that can be included in the tablet computing device or smart phone. The input can be part of direct user interaction, as well as providing environmental input to the tablet computing device or smart phone.

In one embodiment, the tablet computing device or smart phone includes power management 350 that manages battery power usage, charging of the battery, and features related to power saving operation. Memory subsystem 360 includes memory devices for storing information in the tablet computing device or smart phone. Connectivity 370 includes hardware devices (e.g., wireless and/or wired connectors and communication hardware) and software components (e.g., drivers, protocol stacks) to the tablet computing device or smart phone to communicate with external devices. Cellular connectivity 372 may include, for example, wireless carriers such as GSM (global system for mobile communications), CDMA (code division multiple access), TDM (time division multiplexing), or other cellular service standards). Wireless connectivity 374 may include, for example, activity that is not cellular, such as personal area networks (e.g., Bluetooth), local area networks (e.g., WiFi), and/or wide area networks (e.g., WiMax), or other wireless communication.

Peripheral connections 380 include hardware interfaces and connectors, as well as software components (e.g., drivers, protocol stacks) to make peripheral connections as a peripheral device ("to" 382) to other computing devices, as well as have peripheral devices ("from" 384) connected to the tablet computing device or smart phone, including, for example, a "docking" connector to connect with other computing devices. Peripheral connections 380 include common or standards-based connectors, such as a Universal Serial Bus (USB) connector, DisplayPort including MiniDisplayPort (MDP), High Definition Multimedia Interface (HDMI), Firewire, etc.

Figure 3C:
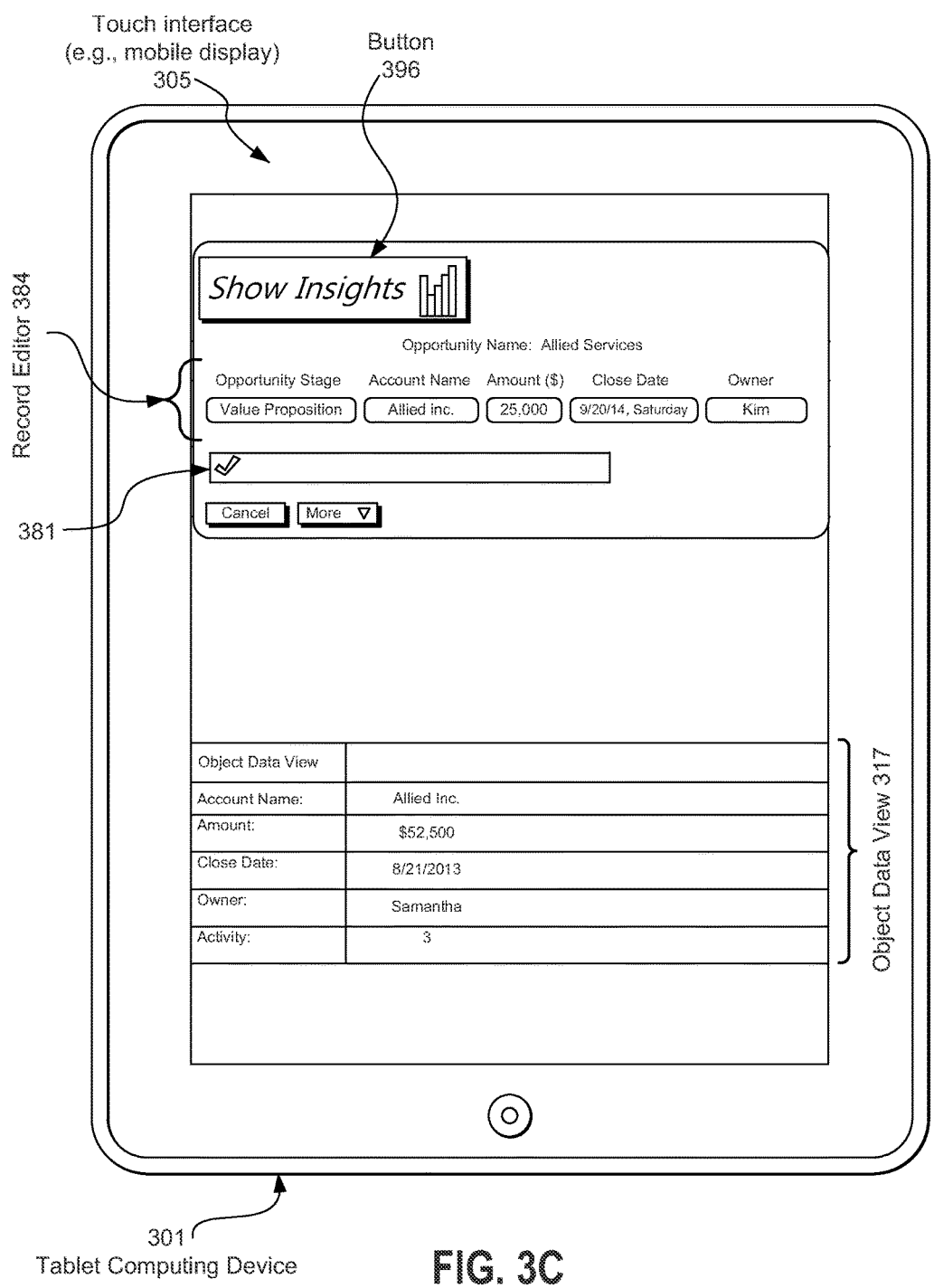
FIG. 3C depicts an exemplary graphical interface operating at a mobile, smartphone, or tablet computing device in accordance with the embodiments.

FIG. 3C depicts an exemplary graphical interface operating at a mobile, smartphone, or tablet computing device 301 in accordance with the embodiments. In particular, there is depicted a tablet computing device 301 having embodied therein a graphical user interface such as a mobile display including touch interfaces capable of display. Presented or depicted to the mobile display 305 is the object data view 317 in which various records, data elements, or other information of interest to the user of the particular application are depicted to the user via the graphical user interface/mobile display 305. Various navigation elements and manipulatable graphical elements are depicted here, such as record editor 384, drop down navigation menu 381, and lastly the button 396 (e.g., show insights button or other relevant trigger to initiate a request for on-demand analytic insights from a remote services provider such as the host organization described previously).

It is within this context that the various embodiments are employed. For instance, the tablet computing device 301 (or any other user client device including PCs, web-browser enabled devices, and other user devices capable of displaying a graphical user interface) is utilized to execute the application and display the graphical user interface described previously (e.g., such as element 220 of FIG. 2). The button 396 or other user event triggers a user initiated request for on-demand analytic insights that is communicated via the tablet computing device's 301 communication interface to the remote services provided by a host organization which then handled by a hosted analytics on-demand platform as described previously such that a relevant visualization may be returned to the tablet computing device 301 for display via the graphical user interface.

Cloud based computing services including on-demand services and subscription services are additionally being utilized by mobile devices to deliver information about records. For example, a screen may be displayed to show information about a salesperson's sales opportunities, with the information being pulled via the cloud utilizing the mobile device's communications interface. For instance, as depicted at FIG. 3C, there is an exemplary list of sales opportunities for a particular user, as well as a record editor 384. However, prior analytics solutions provide any associated reports, charts, and visualizations to be displayed on separate screens, where a report must be selected, customized, and then run to display the relevant visualization, sometimes requiring the user to not only switch screens, but additionally switch applications entirely. As a result, the exemplary user may not have quick access to relevant data analytics from the screen showing information about the salespersons' opportunities, necessitating the user to change screens, change contexts, identify and select the appropriate report, customize the report, potentially request the customized report be included with the relevant application or graphical user interface, before finally being able to access the visualization. Such activities make it unlikely that the requested report would be available for use to the salesperson on the fly or even with short notice, and certainly not available seamlessly and on-demand through the application's screen and graphical user interface upon which the object data (e.g., the salespersons' opportunities) is presently being viewed at the device.

Figure 3D:
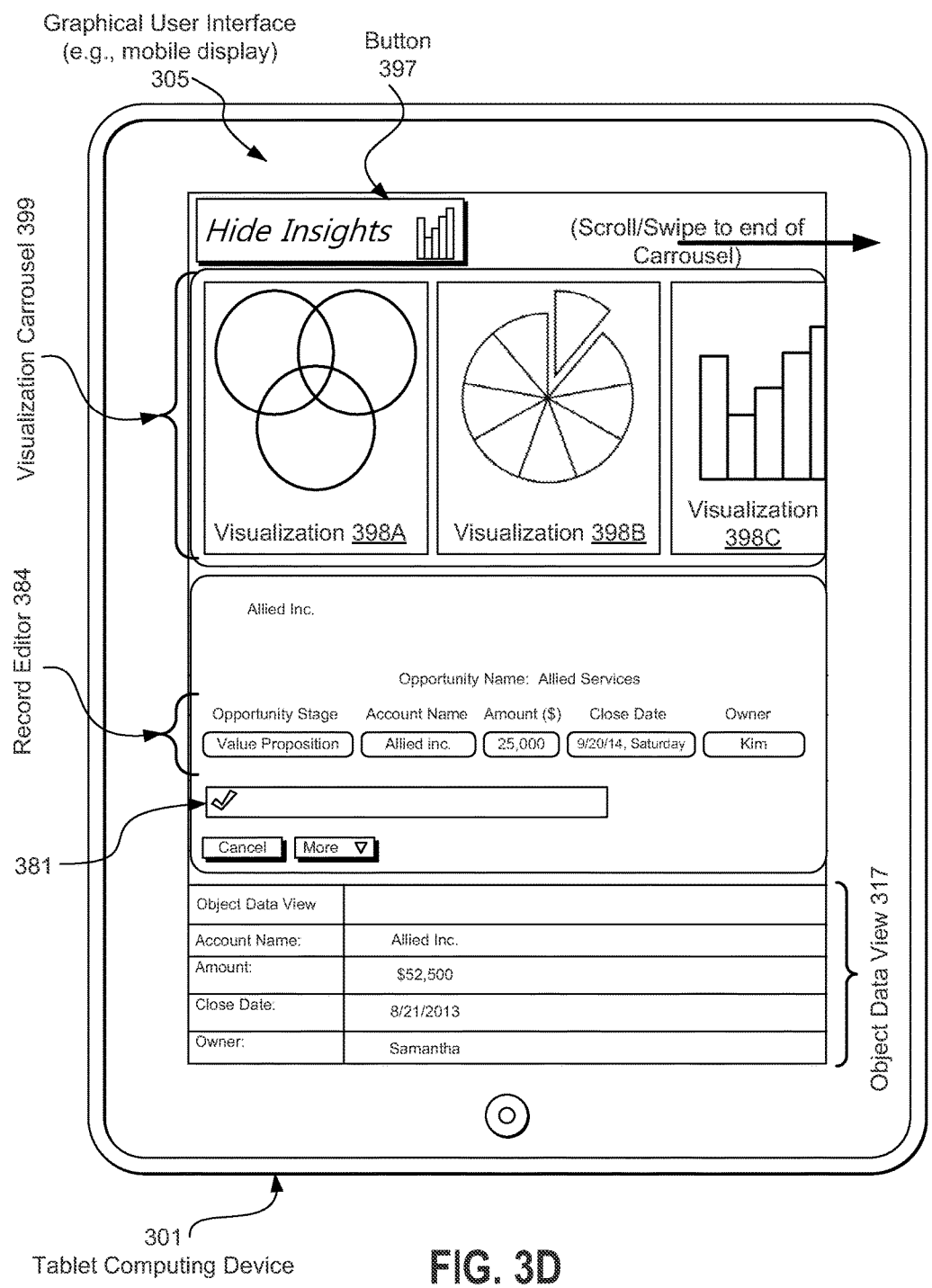
FIG. 3D depicts the exemplary graphical interface operating at a mobile, smartphone, or tablet computing device having had the button triggered or clicked by the user.

FIG. 3D depicts the exemplary graphical interface operating at a mobile, smartphone, or tablet computing device 301 having had the button triggered or clicked by the user. In particular, button 396 from FIG. 3C having been clicked now reveals the visualization carrousel 399 within the graphical user interface 305 of the exemplary tablet computing device 301 and the button 396 from FIG. 3C now is button 397 to hide the insights revealed within the visualization carrousel 399, should the user desire to do so.

Regardless, once the visualization carrousel 399 is revealed pursuant to the user clicking or triggering the request for on-demand analytic insights from a remote services provider as described previously, the visualization carrousel 399 depicts a series of available visualizations 398A, 398B, and 398C based on the request sent from the device pursuant to the user clicking the button to trigger the request and additionally based on available context passed with the request. For instance, in this particular example, the user is, by way of illustration only, a salesperson who is viewing available opportunities at the mobile display 305, and thus, when the show insights button 396 is pressed at FIG. 3C, a series of relevant visualizations, charts, graphs, reports, and available data aggregations will be provided based on the repository (e.g., element 230 from FIG. 2) which provides the meta data mapping between two or more tables such that a database join may combine the information sources and provide the data and an associated visualization back to the mobile device for display.

Notably, the provided visualizations 398A, 398B, and 398C are not initially part of the display, but rather, are requested by the user at the user client device by clicking the button or other appropriate trigger, the request is handled by the analytics on-demand platform at the host organization, and then returned to the user for display via the user client device, for instance, via the visualization carrousel 399 as depicted here.

In an on-demand services environment, such as in a salesforce automation (SFA) application, data objects such as accounts, sales opportunities, leads, cases, groups, files, patients, medications, etc., may be associated with data that can be utilized by the analytics on-demand platform to create one or more analytic reports on-demand providing a more intuitive and seamless way for an end user to launch analytics on any page within such an on-demand services environment. Without requiring the user to pre-create any reports or tables the relevant information may be quickly visualized, aggregated, charted, or otherwise provided to the user's graphical display on demand.

As depicted at FIG. 3C, the button 396 may be provided on a screen that has a call to action for the viewing user to "Show Insights" or simply be labeled as a "Show Insights" button 396. According to particular embodiments, once the button or other user interface element is triggered, a stream or series of analytics widgets related object data being viewed for the particular user (e.g., such as the sales opportunities for a salesperson user) is then provided back to the user responsive to the request via the visualization carrousel 399. These widgets need not be formal reports that are created in the on-demand services environment but rather are filtered according to context from the repository of CRTs, reports, mappings, and visualizations on the fly so as to provide a variety of different charts, tables, reports, visualizations, etc., including for example: pie charts, bar charts, trending line reports, and so forth. Different types of information may be displayed based on interactions with the page by the user.

Other interactive components may be further included within the graphical user interface 305 above or below the visualization carrousel 399 such as a posting interface for posting comments or the widget, visualization, or snapshot of the visualizations 398A-C to a collaborative feed or social network. Other interactive components may include an interface for emailing the visualizations 398A-C or viewing a filtered report on the fly. The visualizations 398A-C within the carrousel may be scrolled or swiped through at the graphical user interface 305 and may be zoomed by tapping on the widget or pinching, etc., using well known graphical user interface 305 gestures and movements.

Very often information provided to users on a particular page through a tabular format needs to be visualized to enable the user to derive insights from the data. One way of doing so is to pre-create and embed charts before the page is requested and viewed by a user. Unfortunately, it is often the case that such charts, tables, graphs, and other visualizations are not embedded when the page is initially built and the users must subsequently request the desired visualizations, and then wait for the appropriate support staff to make the necessary changes.

Use of the analytics on demand functionality as described herein overcomes these problems by enabling users to launch analytics on any page with the simple press of a button, which in turn causes a carrousel of relevant charts, graphs, and other relevant visualizations 398A-B for page to be returned by the host organization and launched or displayed to the users computing device.

Enabling users to visualize information on the fly without having to pre-create or pre-arrange for any reports or tables can be extremely valuable in many situations as it eliminates the problem of requiring that users know what kind of data and data visualizations they require in advance.

Figure 4:
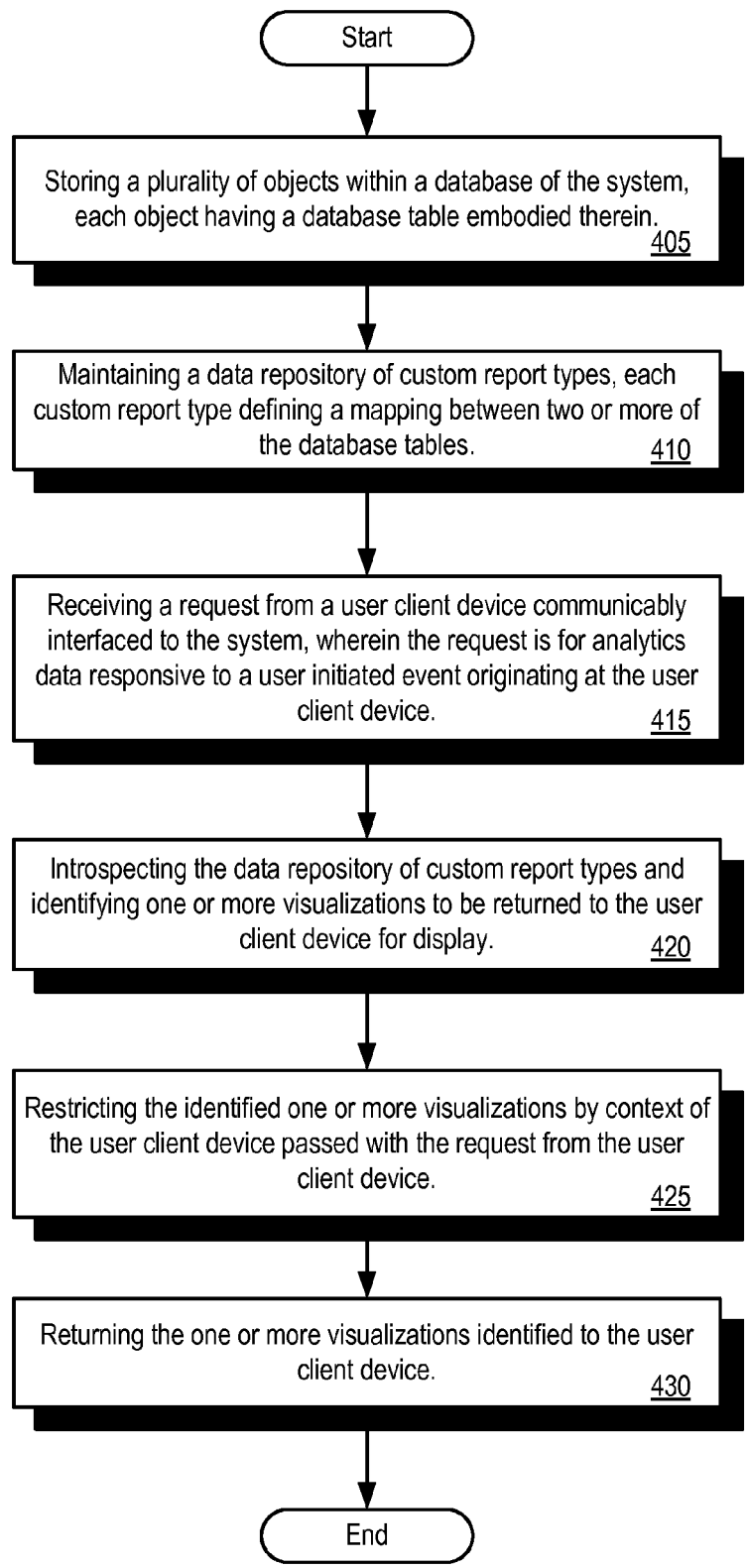
FIG. 4 is a flow diagram illustrating a method for implementing analytics on demand functionality in accordance with disclosed embodiments.

FIG. 4 is a flow diagram illustrating a method 400 for implementing analytics on demand functionality in accordance with disclosed embodiments. Method 400 may be performed by processing logic that may include hardware (e.g., circuitry, dedicated logic, programmable logic, microcode, etc.), software (e.g., instructions run on a processing device) to perform various operations such as storing, maintaining, receiving, introspecting, restricting, returning, executing, presenting, interfacing, communicating, transmitting, querying, encrypting, decrypting, processing, providing, determining, triggering, displaying, retrieving, updating, sending, etc., in pursuance of the systems and methods as described herein. For example, user client devices 106A-C as depicted at FIG. 1, the user client device 200 and the host organization or an implementing system in accordance with the depiction of FIG. 2, the system 500 at FIG. 5, the user system 612 at FIGS. 6A and 6B respectively, or the machine 700 at FIG. 7, may implement the described methodologies. Some of the blocks and/or operations listed below are optional in accordance with certain embodiments. The numbering of the blocks presented is for the sake of clarity and is not intended to prescribe an order of operations in which the various blocks must occur.

At block 405, processing logic stores a plurality of objects within a database of the system, each object having a database table embodied therein.

At block 410, processing logic maintains a data repository of custom report types, each custom report type defining a mapping between two or more of the database tables.

At block 415, processing logic receives a request from a user client device communicably interfaced to the system, in which the request is for analytics data responsive to a user initiated event originating at the user client device.

At block 420, processing logic introspects the data repository of custom report types and identifying one or more visualizations to be returned to the user client device for display.

At block 425, processing logic restricts the identified one or more visualizations by context of the user client device passed with the request from the user client device.

At block 430, processing logic returns the one or more visualizations identified to the user client device.

According to another embodiment of method 400, receiving the request from the user client device includes receiving a request from the user client device responsive to the user initiated event at the user client device, the user initiated event corresponding to the activation of a show insights button displayed to a graphical user interface at the user client device.

According to another embodiment, method 400 further includes: receiving a user selection at one of the visualizations returned to the user client device, the user selection captured at a sub-menu from which the user selection specifies one of a line chart, a bar chart, a horizontal bar chart, or a pie chart for an existing visualization to modify the depiction of information within the visualization; and updating the visualization at the graphical user interface according to the user selection.

In accordance with a particular embodiment, there is non-transitory computer readable storage media having instructions stored thereon that, when executed by a processor of a system, the instructions cause the system to perform operations including: storing a plurality of objects within a database of the system, each object having a database table embodied therein; maintaining a data repository of custom report types, each custom report type defining a mapping between two or more of the database tables; receiving a request from a user client device communicably interfaced to the system, in which the request is for analytics data responsive to a user initiated event originating at the user client device; introspecting the data repository of custom report types and identifying one or more visualizations to be returned to the user client device for display; restricting the identified one or more visualizations by context of the user client device passed with the request from the user client device; and returning the one or more visualizations identified to the user client device.

Figure 5:
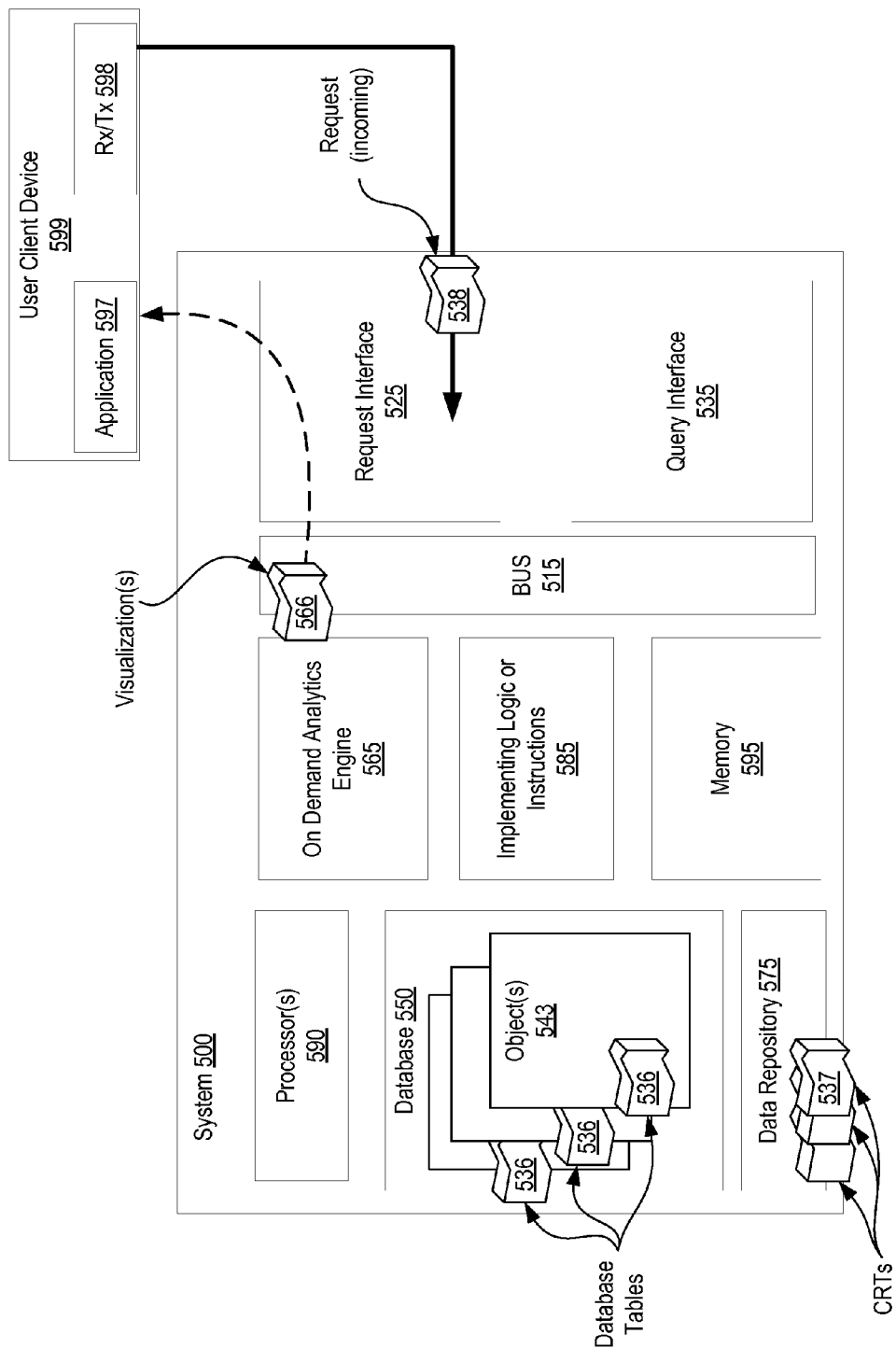
FIG. 5 shows a diagrammatic representation of a system in accordance with which embodiments may operate, be installed, integrated, or configured.

FIG. 5 shows a diagrammatic representation of a system 500 within which embodiments may operate, be installed, integrated, or configured. In accordance with one embodiment, there is a system 500 having at least a processor 590 and a memory 595 therein to execute implementing logic and/or instructions 585. Such a system 500 may communicatively interface with and cooperatively execute with the benefit of a hosted computing environment, such as a host organization, a multi-tenant environment, an on-demand service provider, a cloud based service provider, a client-server environment, etc.

According to the depicted embodiment, the system 500 includes the processor 590 and the memory 595 to execute instructions at the system 500; a database 550 to store a plurality of objects 543, each object having a database table 536 stored therein; a data repository 575 of custom report types 537, each of which define a mapping between two or more of the database tables 536; a request interface 525 to receive a request 538 from a user client device 599 for analytics data responsive to a user initiated event; an on-demand analytics engine 565 to introspect the data repository 575 of custom report types 537 and identify one or more visualizations 566 to be returned to the user client device 599 for display, the identified one or more visualizations 566 being restricted by context of the user client device 599 passed with the request 538 from the user client device 599; and in which the request interface 525 is to return the one or more visualizations 566 identified to the user client device 599.

According to another embodiment of system 500, each of the custom report types within the data repository are defined by a user or a customer organization which accesses on-demand services or cloud based computing services or subscription based services via the system.

According to another embodiment of system 500, the custom report types defined by the user or the customer organization include at least a data mapping between data elements within two separate and distinct database tables stored in the database by the plurality of objects.

According to another embodiment of system 500, the request interface to receive the request from the user client device includes receiving a request from the user client device responsive to the user initiated event at the user client device, the user initiated event corresponding to the activation of a show insights button displayed to a graphical user interface at the user client device.

For example, responsive to a user clicking the display insights button on a given page within a graphical user interface, the system will commence to generate one or more analytics widgets, visualizations, charts, graphs, etc., based on the context passed and then return those to the user client device 599 for display within the graphical user environment, for instance, within a carrousel capable of providing a navigable view of the series of visualizations returned. In such a way, customer experiences may be improved by providing better insights and tools to such customers while they are interacting with their data, and by even providing answers or insights to questions that the customers themselves do not yet know to ask.

According to another embodiment of system 500, an application 597 executing at the user client device 599 handles the user initiated event locally at the user client device 599 and generates and transmits (e.g., via Rx/Tx 598) the request 538 to the request interface 525 of the system 500; in which the user client device is to display a button as a graphical component of a Graphical User Interface (GUI) established by the application 597 at the user client device 599; and in which the GUI established by the application is to receive a click, touch, swipe, or other user gesture event at the button displayed, programmatically triggering the user initiated event causing the application to generate and transmit the request 538 to the system 500.

According to another embodiment of system 500, the on-demand analytics engine to introspect the data repository of custom report types includes the on-demand analytics engine to generate an inventory of available custom report types restricted by context passed with the request from the user client device.

According to another embodiment of system 500, the request 538 from the user client device 599 specifies a request for on-demand analytics to be returned to the user client device and additionally specifies context, the context including at least a UserID corresponding to the user logged in at the user client device and a parent object identifier corresponding to one of the plurality of objects from the database having its data at least partially displayed to the user client device at the time the user client device transmits the request to the system.

According to another embodiment of system 500, the identified one or more visualizations being restricted by context of the user client device passed with the request from the user client device includes the on-demand analytics engine to filter an available inventory of custom report types by at least a UserID affiliated with the request from the user client device and further by an object identifier passed with the request as context, the object identifier corresponding to one of the plurality of objects viewed by the user client device at the time the request is initiated from the user client device.

According to another embodiment of system 500, the context further specifies a child object identifier of the object identifier passed with the request as context, and in which the identified one or more visualizations is further restricted according to the child object identifier.

According to another embodiment of system 500, the plurality of objects constitute object data, the object data having stored therein a plurality of database tables, each database table having a plurality of database records.

According to another embodiment of system 500, each database table 536 corresponds to any one of an arbitrarily customer defined database table; an accounts table; a sales opportunities table; a clients table; a pricing table; a products listing table; an order history table; a contacts table; a medical patients table; a medical treatments table; a medical prescriptions table; a service history table; a physical inventory table; and/or a financial data table.

According to another embodiment of system 500, each object defines a data structure from which information for the visualizations may be retrieved.

According to another embodiment of system 500, the request interface to return the one or more visualizations identified to the user client device includes returning multiple visualizations to the user client device to be displayed within a movable carrousel via a graphical user interface of the user client device.

According to another embodiment of system 500, the one or more visualizations each constitute a graphical representation of text data via any one or more of charts, graphs, pie charts, diagraphs, line charts, bar charts, Venn diagrams, derived trend lines, distribution charts, scatter plots, word clouds, heat maps, histograms, area charts, geographical location charts, and/or composition charts.

According to another embodiment of system 500, the request interface to return the one or more visualizations identified to the user client device includes returning a stream of visualization widgets to the user client device, each executable at the user client device to display the corresponding visualization to a graphical user interface of the user client device.

According to another embodiment, system 500 further includes: a query interface 535 to the database 550 to perform a database join operation on at least the two or more database tables 536 defined by the mapping to create an aggregate dataset; and in which the on-demand analytics engine 565 to generate the one or more visualizations identified using the aggregate dataset resulting from the database join operation on the two or more database tables 536.

According to another embodiment of system 500, the mapping between two or more of the database tables 536 constitutes a defined relationship between two of the plurality of objects by object identifier and a key corresponding to each of the two or more database tables 536; in which the database performs a join operation between the two or more database tables using the mapping to create an aggregate dataset; and in which the aggregate dataset is returned to the on-demand analytics engine 565 from the database for use in generating the visualizations 566.

For instance, there may be a repository of custom report types which provides the meta data mapping between two tables (accounts and contacts, for a join, etc.) in which the custom report type defines the mapping and in which the report itself is the visualization of the mapping (e.g., a medical patient may be an object and another object which is related to the patient may be medications, yet these two are separate and distinct objects and each may be created specifically by the customer along with the customer created CRT that defines the relationship/mapping between the two objects. A user of the hospital management system could therefore create a report/visualization that retrieves the template that shows all of a specific doctor's patients and their medications.

According to another embodiment of system 500, a parent object corresponding to one of the plurality of objects stored at the database system is accessed from and displayed to a graphical user interface of the user client device; in which the parent object is identified and passed with the request as the context by the user client device based on the user accessing the parent object from the user client device; and in which one or more child objects which depend from the parent object are additionally identified and passed with the request as part of the context.

Consider for example a user that logs into to a device, accesses the database of the host organization, and views a parent object, such as a medical patient or views a medication, or views other patients associated with the doctor (e.g., user) in some way, etc. When the button is triggered to request the on-demand analytics data from the graphical user interface, there will be a parent object which is identified to the analytics engine via the context, but the context may additionally capture and identify to the analytics engine the child objects. Clicking on the show insights button thus triggers the request 538 to be passed into the system which in turn causes the on-demand analytics engine 565 to introspect the inventory of existing reports restricted by the context. For example, restricted according to the user actually logged into the device and restricted according to the object referenced at the user client device when the button was clicked and potentially restricted further according to the child objects relevant or viewed in association with the parent object.

The identified visualizations are then returned for display to the user client device, for instance, providing multiple reports to the carrousel with the restraints passed as a payload into the carrousel permitting the reports generated on-demand to be visualized now at the client device's graphical user interface.

According to another embodiment of system 500, the context of the user client device passed with the request from the user client device further includes what object is presently being viewed at the user client device, what object was previously viewed at the user client device, and what object is being navigated to for viewing at the user client device; and in which the one or more visualizations identified to the user client device are further identified and/or prioritized for display to the user client device based on the context provided by the user client device with the request.

According to another embodiment of system 500, the user client device in communication with the system is embodied within one of a laptop computer, a mobile client device, a smartphone, or tablet client device, having integrated therewith a touch interface to display the graphical user interface and to receive user initiated event.

According to another embodiment, system 500 further includes: the receive interface 525 to communicate with a communications interface (e.g., Rx/Tx 598) at the user client device 599 through remote services established by the system 500, in which the system 500 communicates with the user client device 599 via a public Internet; further in which the remote services are implemented by the system at a host organization that serves as a cloud based service provider to the user client device; and still further in which the cloud based service provider hosts an application use by the user client device, the request from the user client device for analytics data responsive to the user initiated event being originated from the application hosted by the cloud based service provider; and lastly in which the cloud based service provider makes the application accessible to authorized users affiliated with the customer organization.

Bus 515 interfaces the various components of the system 500 amongst each other, with any other peripheral(s) of the system 500, and with external components such as external network elements, other machines, client devices, cloud computing services including those implemented by the remote service to which the arrows point to and arrive from, etc. Communications may further include communicating with such external devices via a network interface over a LAN, WAN, or the public Internet.

Figure 6A:
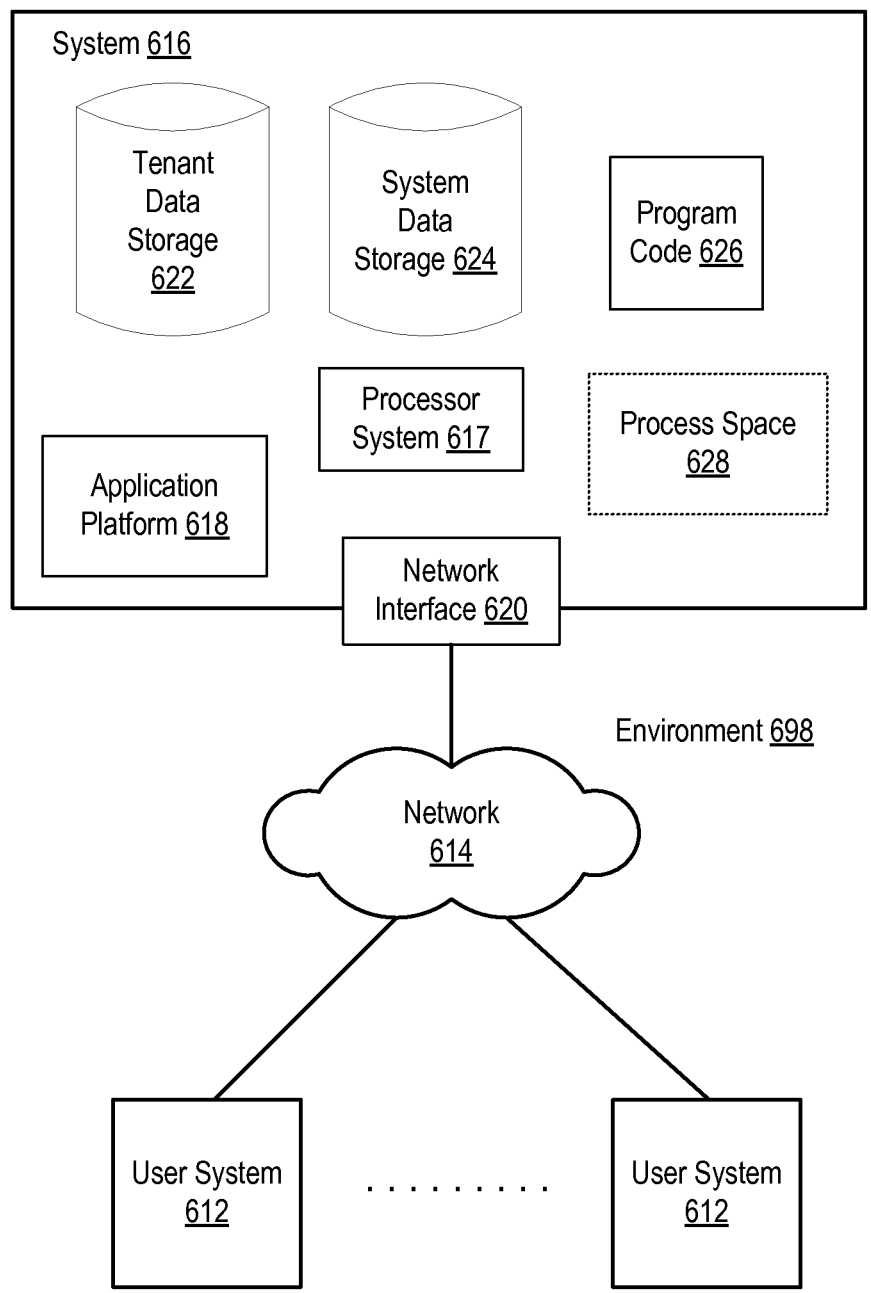
FIG. 6A illustrates a block diagram of an environment in which an on-demand database service may operate in accordance with the described embodiments.

FIG. 6A illustrates a block diagram of an environment 698 in which an on-demand database service may operate in accordance with the described embodiments. Environment 698 may include user systems 612, network 614, system 616, processor system 617, application platform 618, network interface 620, tenant data storage 622, system data storage 624, program code 626, and process space 628. In other embodiments, environment 698 may not have all of the components listed and/or may have other elements instead of, or in addition to, those listed above.

Environment 698 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 6A (and in more detail in FIG. 6B) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" is used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6A, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6A, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6A include conventional, well-known elements that are explained only briefly here. For example, each user system 612 may include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units.

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 6B:
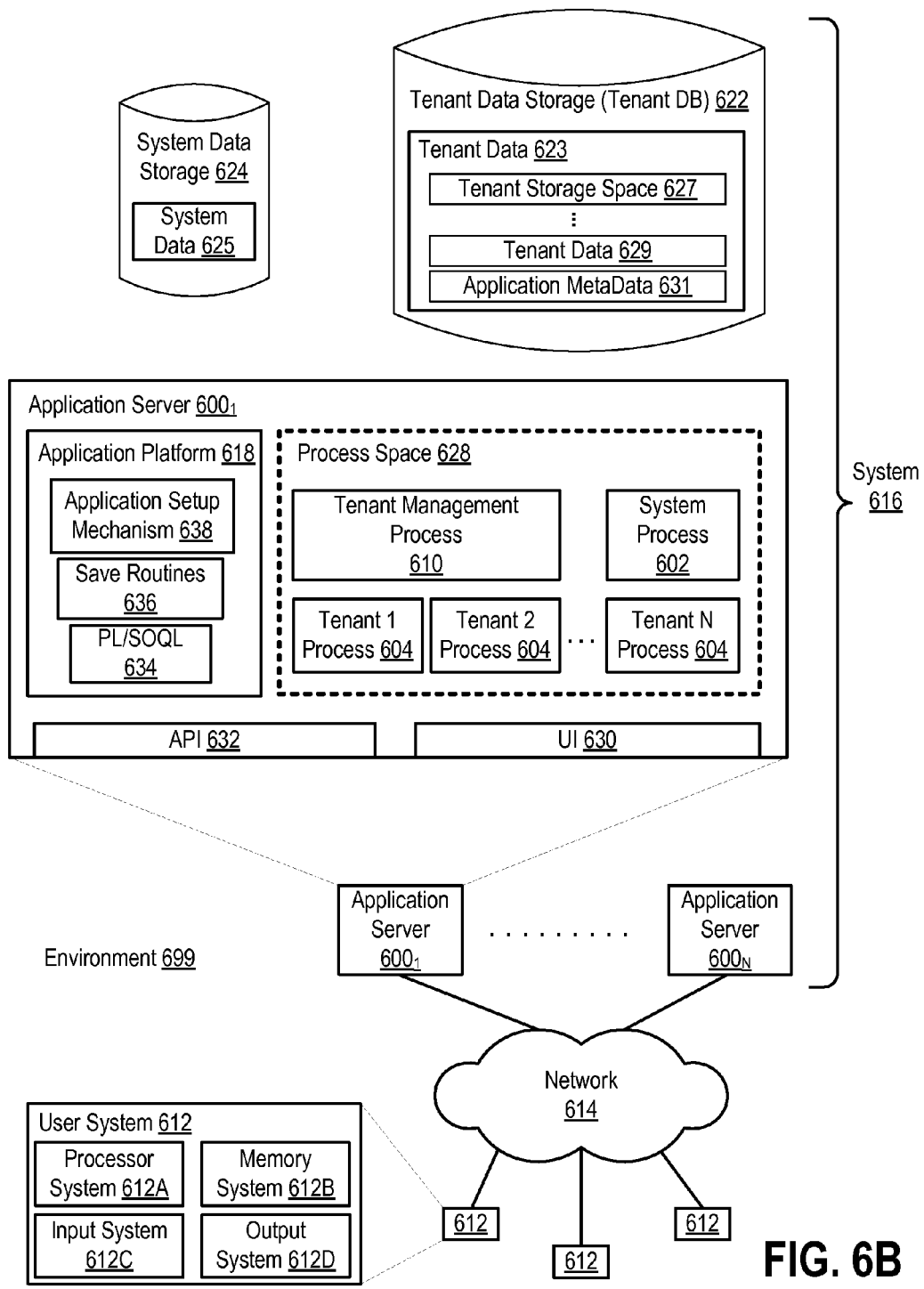
FIG. 6B illustrates another block diagram of an embodiment of elements of FIG. 6A and various possible interconnections between such elements in accordance with the described embodiments.

FIG. 6B illustrates another block diagram of an embodiment of elements of FIG. 6A and various possible interconnections between such elements in accordance with the described embodiments. FIG. 6B also illustrates environment 699. However, in FIG. 6B, the elements of system 616 and various interconnections in an embodiment are illustrated in further detail. More particularly, FIG. 6B shows that user system 612 may include a processor system 612A, memory system 612B, input system 612C, and output system 612D. FIG. 6B shows network 614 and system 616. FIG. 6B also shows that system 616 may include tenant data storage 622, having therein tenant data 623, which includes, for example, tenant storage space 627, tenant data 629, and application metadata 631. System data storage 624 is depicted as having therein system data 625. Further depicted within the expanded detail of application servers $600_{1-N}$ are User Interface (UI) 630, Application Program Interface (API) 632, application platform 618 includes PL/SOQL 634, save routines 636, application setup mechanism 638, process space 628 includes system process space 602, tenant 1-N process spaces 604, and tenant management process space 610. In other embodiments, environment 699 may not have the same elements as those listed above and/or may have other elements instead of, or in addition to, those listed above.

User system 612, network 614, system 616, tenant data storage 622, and system data storage 624 were discussed above in FIG. 6A. As shown by FIG. 6B, system 616 may include a network interface 620 (of FIG. 6A) implemented as a set of HTTP application servers 600, an application platform 618, tenant data storage 622, and system data storage 624. Also shown is system process space 602, including individual tenant process spaces 604 and a tenant management process space 610. Each application server 600 may be configured to tenant data storage 622 and the tenant data 623 therein, and system data storage 624 and the system data 625 therein to serve requests of user systems 612. The tenant data 623 might be divided into individual tenant storage areas (e.g., tenant storage space 627), which can be either a physical arrangement and/or a logical arrangement of data. Within each tenant storage space 627, tenant data 629, and application metadata 631 might be similarly allocated for each user. For example, a copy of a user's most recently used (MRU) items might be stored to tenant data 629. Similarly, a copy of MRU items for an entire organization that is a tenant might be stored to tenant storage space 627. A UI 630 provides a user interface and an API 632 provides an application programmer interface into system 616 resident processes to users and/or developers at user systems 612. The tenant data and the system data may be stored in various databases, such as one or more Oracle™ databases.

Application platform 618 includes an application setup mechanism 638 that supports application developers' creation and management of applications, which may be saved as metadata into tenant data storage 622 by save routines 636 for execution by subscribers as one or more tenant process spaces 604 managed by tenant management process space 610 for example. Invocations to such applications may be coded using PL/SOQL 634 that provides a programming language style interface extension to API 632. Invocations to applications may be detected by one or more system processes, which manages retrieving application metadata 631 for the subscriber making the invocation and executing the metadata as an application in a virtual machine.

Each application server 600 may be communicably coupled to database systems, e.g., having access to system data 625 and tenant data 623, via a different network connection. For example, one application server 600$_1$ might be coupled via the network 614 (e.g., the Internet), another application server 600$_{N-1}$ might be coupled via a direct network link, and another application server 600$_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 Big-IP load balancer) is communicably coupled between the application servers 600 and the user systems 612 to distribute requests to the application servers 600. In one embodiment, the load balancer uses a least connections algorithm to route user requests to the application servers 600. Other examples of load balancing algorithms, such as round robin and observed response time, also can be used. For example, in certain embodiments, three consecutive requests from the same user may hit three different application servers 600, and three requests from different users may hit the same application server 600. In this manner, system 616 is multi-tenant, in which system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 600 to request and update system-level and tenant-level data from system 616 that may require sending one or more queries to tenant data storage 622 and/or system data storage 624. System 616 (e.g., an application server 600 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 7:
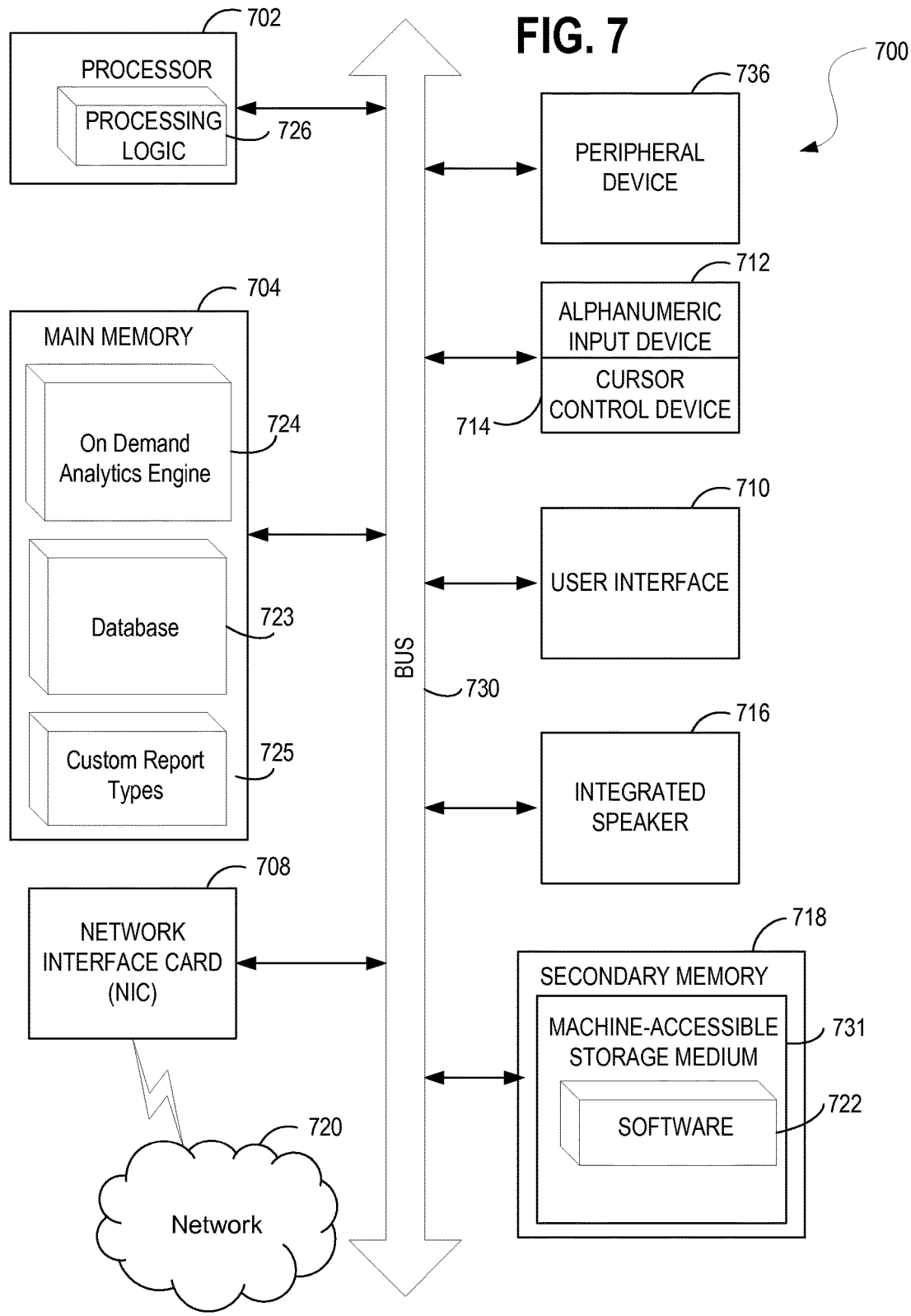
FIG. 7 illustrates a diagrammatic representation of a machine in the exemplary form of a computer system, in accordance with one embodiment.

FIG. 7 illustrates a diagrammatic representation of a machine 700 in the exemplary form of a computer system, in accordance with one embodiment, within which a set of instructions, for causing the machine/computer system 700 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 718 (e.g., a persistent storage device including hard disk drives and a persistent database and/or a multi-tenant database implementation), which communicate with each other via a bus 730. Main memory 704 includes an on demand analytics engine 724 to identify and provide visualizations to a client device on-demand responsive to a request for on-demand analytics. Main memory 704 includes a database 723 to store objects and database tables, and main memory 704 further includes custom report types 725 to be leveraged in generating the visualizations in accordance with the embodiments described herein. Main memory 704 and its sub-elements are operable in conjunction with processing logic 726 and processor 702 to perform the methodologies discussed herein.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 702 is configured to execute the processing logic 726 for performing the operations and functionality which is discussed herein.

The computer system 700 may further include a network interface card 708. The computer system 700 also may include a user interface 710 (such as a video display unit, a liquid crystal display, etc.), an alphanumeric input device 712 (e.g., a keyboard), a cursor control device 714 (e.g., a mouse), and a signal generation device 716 (e.g., an integrated speaker). The computer system 700 may further include peripheral device 736 (e.g., wireless or wired communication devices, memory devices, storage devices, audio processing devices, video processing devices, etc.).

The secondary memory 718 may include a non-transitory machine-readable storage medium or a non-transitory computer readable storage medium or a non-transitory machine-accessible storage medium 731 on which is stored one or more sets of instructions (e.g., software 722) embodying any one or more of the methodologies or functions described herein. The software 722 may also reside, completely or at least partially, within the main memory 704 and/or within the processor 702 during execution thereof by the computer system 700, the main memory 704 and the processor 702 also constituting machine-readable storage media. The software 722 may further be transmitted or received over a network 720 via the network interface card 708.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A system comprising: a processor and a memory to execute instructions at the system; a database system to store a plurality of objects each object having a database table stored therein; a data repository of custom report types each of which define a mapping between two or more of the database tables; a request interface to receive a request from a user client device for analytics data responsive to a user initiated event;

an analytics platform hosted at the system to execute via the processor and the memory of the system, wherein the analytics platform enables on-demand selection and rendering of a data visualization triggered by a user selection specified by the request from the user client device without requiring the user to pre-identify a report to be provided as the data visualization in fulfillment of the request;

wherein the analytics platform additionally receives a context identifying at least the user having submitted the request and one or more objects being referenced at the user client device at the time of the user initiated event; wherein the analytics platform is to further examine the data repository of custom report types and identify one or more visualizations to be returned to the user client device for display, based on the identified one or more visualizations being restricted by the context of the user client device, wherein the context is passed with the request from the user client device;

wherein the request from the user client device specifies a request for on-demand analytics to be returned to the user client device and additionally specifies a context, the context including at least a user identifier corresponding to the user logged in at the user client device and a parent object identifier corresponding to one of the plurality of tables from the database system having its data at least partially displayed to the user client device at the time the user client device transmits the request to the system; and wherein the request interface is to return the one or more visualizations identified to the user client device in fulfillment of the request from the user client device.

2. The system of claim 1, wherein the context identifying the one or more objects being referenced at the user client device comprises the context to identify at least a parent object being referenced and one or more child objects being referenced at the user client device at the time of the user initiated event.

3. The system of claim 1, wherein the custom report types defined by the user or a customer organization comprise at least a data mapping between data elements within two separate and distinct database tables stored in the database system by the plurality of objects.

4. The system of claim 1, wherein the request interface to receive the request from the user client device comprises receiving a request from the user client device responsive to the user initiated event at the user client device, the user initiated event corresponding to the activation of a show insights button displayed to a graphical user interface at the user client device.

5. The system of claim 1:
wherein an application executing at the user client device handles the user initiated event locally at the user client device and generates and transmits the request to the request interface of the system;
wherein the user client device is to display a button as a graphical component of a Graphical User Interface (GUI) established by the application at the user client device; and
wherein the GUI established by the application is to receive a click, touch, swipe, or other user gesture event at the button displayed, programmatically triggering the user initiated event causing the application to generate and transmit the request to the system.

6. The system of claim 1, wherein the analytics platform is to further examine the data repository of custom report types to generate an inventory of available custom report types restricted by context passed with the request from the user client device.

7. The system of claim 1, wherein the identified one or more visualizations being restricted by context of the user client device passed with the request from the user client device comprises the analytics platform to filter an available inventory of custom report types by at least a user identifier affiliated with the request from the user client device and further by an object identifier passed with the request as context, the object identifier corresponding to one of the plurality of objects viewed by the user client device at the time the request is initiated from the user client device.

8. The system of claim 7, wherein the context further specifies a child object identifier of the object identifier passed with the request as context, and wherein the identified one or more visualizations is further restricted according to the child object identifier.

9. The system of claim 1, wherein the plurality of objects constitute object data, the object data having stored therein a plurality of database tables, each database table having a plurality of database records.

10. The system of claim 9, wherein each database table corresponds to any one of an arbitrarily customer defined database table; an accounts table; a sales opportunities table; a clients table; a pricing table; a products listing table; an order history table; a contacts table; a medical patients table; a medical treatments table; a medical prescriptions table; a service history table; a physical inventory table; and/or a financial data table.

11. The system of claim 9, wherein each object defines a data structure from which information for the visualizations may be retrieved.

12. The system of claim 1, wherein the request interface to return the one or more visualizations identified to the user client device comprises returning multiple visualizations to the user client device to be displayed within a movable carrousel via a graphical user interface of the user client device.

13. The system of claim 1, wherein the one or more visualizations each constitute a graphical representation of text data via any one or more of charts, graphs, pie charts, diagraphs, line charts, bar charts, Venn diagrams, derived trend lines, distribution charts, scatter plots, word clouds, heat maps, histograms, area charts, geographical location charts, and/or composition charts.

14. The system of claim 1, wherein the request interface to return the one or more visualizations identified to the user client device comprises returning a stream of visualization widgets to the user client device, each executable at the user client device to display the corresponding visualization to a graphical user interface of the user client device.

15. The system of claim 1, further comprising: a query interface to the database system to perform a database join operation on at least the two or more database tables defined by the mapping to create an aggregate dataset; and wherein the analytics platform to generate the one or more visualizations identified using the aggregate dataset resulting from the database join operation on the two or more database tables.

16. The system of claim 1, wherein the mapping between two or more of the database tables constitutes a defined relationship between two of the plurality of objects by object identifier and a key corresponding to each of the two or more database tables; wherein the database system performs a join operation between the two or more database tables using the mapping to create an aggregate dataset; and wherein the aggregate dataset is returned to the analytics platform from the database system for use in generating the visualizations.

17. The system of claim 1, wherein a parent object corresponding to one of the plurality of objects stored at the database system is accessed from and displayed to a graphical user interface of the user client device; wherein the parent object is identified and passed with the request as the context by the user client device based on the user accessing the parent object from the user client device; and wherein one or more child objects which depend from the parent object are additionally identified and passed with the request as part of the context.

18. The system of claim 1 wherein the context of the user client device passed with the request from the user client device further includes what object is presently being viewed at the user client device, what object was previously viewed at the user client device, and what object is being navigated to for viewing at the user client device; and wherein the one or more visualizations identified to the user client device are further identified and/or prioritized for display to the user client device based on the context provided by the user client device with the request.

19. The system of claim 1, wherein the user client device in communication with the system is embodied within one of a laptop computer, a mobile client device, a smartphone, or tablet client device, having integrated therewith a touch interface to display the graphical user interface and to receive user initiated event.

20. The system of claim 1, further comprising: the receive interface to communicate with a communications interface at the user client device through remote services established by the system, wherein the system communicates with the user client device via a public Internet; wherein the remote services are implemented by the system at a host organization that serves as a cloud based service provider to the user client device; wherein the cloud based service provider hosts an application use by the user client device, the request from the user client device for analytics data responsive to the user initiated event being originated from the application hosted by the cloud based service provider; and wherein the cloud based service provider makes the application accessible to authorized users affiliated with a customer organization.

21. A computer-implemented method to execute within a system having at least a processor and a memory therein, wherein the computer-implemented method comprises: storing a plurality of objects within a database of the system, each object having a database table embodied therein; maintaining a data repository of custom report types, each custom report type defining a mapping between two or more of the database tables; receiving a request from a user client device communicably interfaced to the system, wherein the request is for analytics data responsive to a user initiated event originating at the user client device; executing an analytics platform at the system via the processor and the memory of the system, wherein the analytics platform enables on-demand selection and rendering of a data visualization triggered by a user selection specified by the request from the user client device without requiring the user to pre-identify a report to be provided as the data visualization in fulfillment of the request; receiving, at the analytics platform, a context identifying at least the user having submitted the request and one or more objects being referenced at the user client device at the time of the user initiated event;
  wherein the request from the user client device specifies a request for on-demand analytics to be returned to the user client device and additionally specifies a context, the context including at least a user identifier corresponding to the user logged in at the user client device and a parent object identifier corresponding to one of the plurality of tables from the database system having its data at least partially displayed to the user client device at the time the user client device transmits the request to the system;
  examining, via the analytics platform, the data repository of custom report types and identifying one or more visualizations to be returned to the user client device for display based on the context of the user client device, wherein the context is as passed with the request from the user client device; restricting the identified one or more visualizations by the context of the user client device; and returning the one or more visualizations identified to the user client device.

22. The computer-implemented method of claim 21, wherein receiving the request from the user client device comprises receiving a request from the user client device responsive to the user initiated event at the user client device, the user initiated event corresponding to the activation of a show insights button displayed to a graphical user interface at the user client device.

23. The computer-implemented method of claim 21, further comprising:
  receiving a user selection at one of the visualizations returned to the user client device, the user selection captured at a sub-menu from which the user selection specifies one of a line chart, a bar chart, a horizontal bar chart, or a pie chart for an existing visualization to modify the depiction of information within the visualization; and
  updating the visualization at the graphical user interface according to the user selection.

24. Non-transitory computer readable storage media having instructions stored thereon that, when executed by a processor of a system, the instructions cause the system to perform operations including: storing a plurality of objects within a database of the system, each object having a database table embodied therein; maintaining a data repository of custom report types, each custom report type defining a mapping between two or more of the database tables; receiving a request from a user client device communicably interfaced to the system, wherein the request is for analytics data responsive to a user initiated event originating at the user client device; executing an analytics platform at the system via the processor and the memory of the system, wherein the analytics platform enables on-demand selection and rendering of a data visualization triggered by a user selection specified by the request from the user client device without requiring the user to pre-identify a report to be provided as the data visualization in fulfillment of the request; receiving, at the analytics platform, a context identifying at least the user having submitted the request and one or more objects being referenced at the user client device at the time of the user initiated event;
  examining, via the analytics platform, the data repository of custom report types and identifying one or more visualizations to be returned to the user client device for display based on the context of the user client device, wherein the context is passed with the request from the user client device;
  wherein the request from the user client device specifies a request for on-demand analytics to be returned to the user client device and additionally specifies a context, the context including at least a user identifier corresponding to the user logged in at the user client device and a parent object identifier corresponding to one of the plurality of tables from the database system having its data at least partially displayed to the user client device at the time the user client device transmits the request to the system; restricting the identified one or more visualizations by the context of the user client device; and returning the one or more visualizations identified to the user client device.

* * * * *